United States Patent
Shagawa et al.

(10) Patent No.: US 12,117,428 B2
(45) Date of Patent: Oct. 15, 2024

(54) LIQUID CHROMATOGRAPHY SEPARATION SYSTEM

(71) Applicant: SHIMADZU CORPORATION, Kyoto (JP)

(72) Inventors: Tomohiro Shagawa, Kyoto (JP); Saki Yoshino, Kyoto (JP); Iori Otomo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 604 days.

(21) Appl. No.: 17/284,949

(22) PCT Filed: Sep. 20, 2019

(86) PCT No.: PCT/JP2019/037080
§ 371 (c)(1),
(2) Date: Apr. 13, 2021

(87) PCT Pub. No.: WO2020/080041
PCT Pub. Date: Apr. 23, 2020

(65) Prior Publication Data
US 2021/0349062 A1  Nov. 11, 2021

(30) Foreign Application Priority Data
Oct. 15, 2018 (JP) .................. 2018-194271

(51) Int. Cl.
*G01N 30/82* (2006.01)
*G01N 30/86* (2006.01)
*G01N 30/02* (2006.01)

(52) U.S. Cl.
CPC ......... *G01N 30/82* (2013.01); *G01N 30/8631* (2013.01); *G01N 2030/027* (2013.01)

(58) Field of Classification Search
CPC ..................... G01N 30/82; G01N 30/8631
See application file for complete search history.

(56) References Cited

U.S. PATENT DOCUMENTS

2002/0052701 A1* 5/2002 Gorenstein ............ G01N 30/82
702/74
2009/0314716 A1* 12/2009 Osaka ................... G01N 30/82
210/656

(Continued)

FOREIGN PATENT DOCUMENTS

JP       04-134262 A    5/1992
JP       2004-508566 A  3/2004

(Continued)

OTHER PUBLICATIONS

JP2008185558A (Year: 2008).*

(Continued)

*Primary Examiner* — Manish S Shah
*Assistant Examiner* — Sharad Timilsina
(74) *Attorney, Agent, or Firm* — Renner, Otto, Boisselle & Sklar, LLP

(57) ABSTRACT

A liquid chromatography separation system includes a separator, a collector, a switch valve and a collection controller. The collector has at least one sample loop and connects the sample loop to a position farther downstream than the separator and collect an eluate including a desired sample component among sample components obtained by separation in the separator in the sample loop. The switch valve switches between a state in which the separator is connected the sample loop and a state in which the separator is not connected to the sample loop. The collection controller is configured to control an operation of switching the switch valve and collect a predetermined amount, which is equal to or smaller than a volume of the sample loop, of an eluate including a desired sample component obtained by separation in the separator in the sample loop from a peak-beginning point of the sample component.

15 Claims, 4 Drawing Sheets

(56) References Cited

U.S. PATENT DOCUMENTS

| | | | | |
|---|---|---|---|---|
| 2013/0146479 A1* | 6/2013 | Brouwer | ................ | G01R 33/46 |
| | | | | 205/792 |
| 2013/0319945 A1* | 12/2013 | Rosch | ................ | G01N 30/0005 |
| | | | | 210/659 |
| 2014/0014585 A1* | 1/2014 | Dourdeville | ........... | G01N 30/04 |
| | | | | 210/656 |

FOREIGN PATENT DOCUMENTS

| | | | |
|---|---|---|---|
| JP | 2008185558 A | * | 8/2008 |
| JP | 2008185558 A1 | * | 8/2008 |
| JP | 2010-008047 A | | 1/2010 |

OTHER PUBLICATIONS

International Search Report for corresponding Application No. PCT/JP2019/037080, mailed Dec. 24, 2019.

English Machine Translation of Written Opinion for corresponding Application No. PCT/JP2019/037080, mailed Dec. 24, 2019.

\* cited by examiner

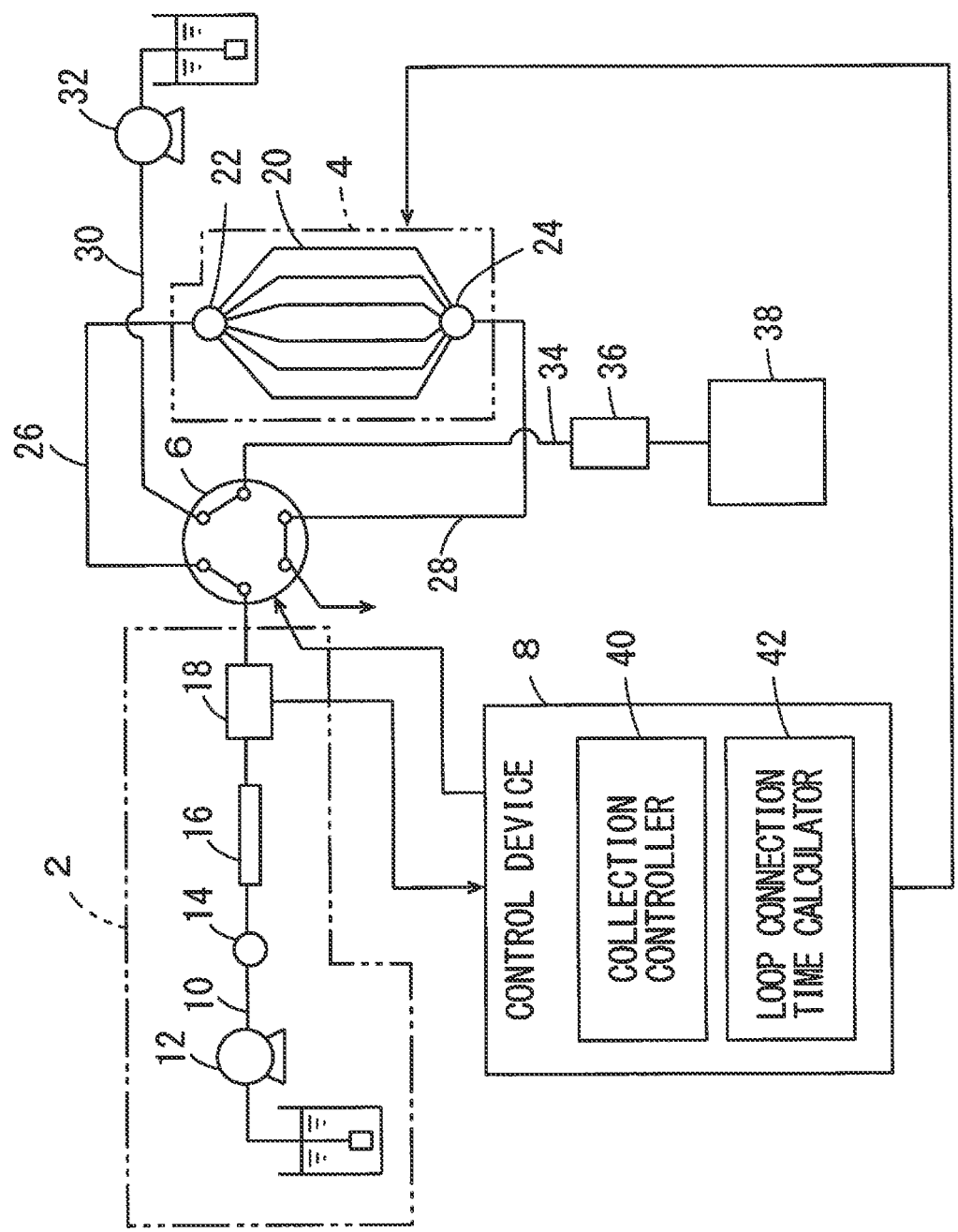
F I G. 1

LIQUID CHROMATOGRAPHY SEPARATION SYSTEM

TECHNICAL FIELD

The present invention relates to a liquid chromatography separation system that includes a function of collecting components into which a sample is separated by liquid chromatography in a sample loop.

BACKGROUND ART

There is a system (hereinafter referred to as a liquid chromatography separation system) that includes a function of collecting components generated by separation by liquid chromatography in a sample loop.

The liquid chromatography separation system has a sample loop connected to a downstream portion of an analysis flow path at which a separation column and a detector are provided via a switch valve and collects an eluate including a desired component (target component) detected by the detector in the sample loop by switching states of the switch valve based on a signal of the detector. Thereafter, the target component collected in the sample loop is transferred for a two-dimensional step, for example, a further liquid chromatography analysis or a fraction collector by sending of a solvent to the sample loop.

SUMMARY OF INVENTION

Technical Problem

Methods of collecting a target component in a sample loop include a method of switching a switch valve by depression of a button by a user, etc. in addition to a method of identifying a time at which a peak of a target component is detected from a chromatogram acquired in advance in regard to a same sample and setting a point in time at which the switch valve is to be switched such that the target component is collected in the sample loop based on the time, and a method of automatically detecting a peak of a target component from a parameter such as a slope of peak of a chromatogram and switching the switch valve based on the detection of the peak.

Meanwhile, there is a limit to a volume of a sample loop, and an amount of an eluate including a target component may be larger than the volume of the sample loop. In this case, even in a case where the switch valve is switched such that a peak-beginning point to a peak-ending point of a target component is collected in the sample loop, the front portion of peak of the target component actually flows out of the sample loop and only the rear portion of peak of the target component is to be collected in the sample loop. Generally, a peak of a chromatogram often extends rearwardly. There is a problem that the concentration of a collected target component is extremely low when only the rear portion of peak of the target component is collected in the sample loop.

With a conventional liquid chromatography separation system, it is not possible to set which portion of peak of a target component is to be collected in a sample loop.

As such, an object of the present invention is to prevent an eluate including only a low-concentration sample component from being collected in a sample loop.

Solution to Problem

A liquid chromatography separation system according to the present invention includes a separator that is provided with a sample injector, a separation column and a detector on an analysis flow path through which a mobile phase flows and separates a sample injected into the analysis flow path by the sample injector into components, a collector that has one or more sample loops, connects the sample loop to a position farther downstream than the separator and collects an eluate, including a target component into which the sample is separated in the separator, in the sample loop, a switch valve for switching between a first state in which the sample loop is connected to the position farther downstream than the separator and a second state in which the sample loop is not connected to the position farther downstream than the separator, and a collection controller that is configured to detect a peak-beginning point and/or a peak apex of the target component based on a signal of the detector, control an operation of switching the switch valve based on the detected peak-beginning point and/or the detected peak apex and collect a portion including the peak-beginning point or the peak apex of the eluate including the target component in the sample loop.

That is, the liquid chromatography separation system according to the present invention operates to collect an eluate including a target component in a sample loop such that a peak-beginning point and/or a peak apex of the target component is included. Therefore, even in a case where an amount of an eluate including a target component is larger than a volume of a sample loop, a situation where only a rear portion of peak of the target component is collected in the sample loop does not occur, and an eluate including only a low-concentration target component can be prevented from being collected in the sample loop.

Advantageous Effects of Invention

With the present invention, an eluate including a target component is collected in a sample loop such that a peak-beginning point and/or a peak apex of the target component is included. Therefore, even in a case where an amount of the eluate including the target component is larger than a volume of the sample loop, an eluate only including a low-concentration target component is prevented from being collected in the sample loop.

BRIEF DESCRIPTION OF THE DRAWINGS

FIG. 1 A schematic diagram showing the configuration of one inventive example of a liquid chromatography separation system.

DESCRIPTION OF EMBODIMENTS

Figure 2:
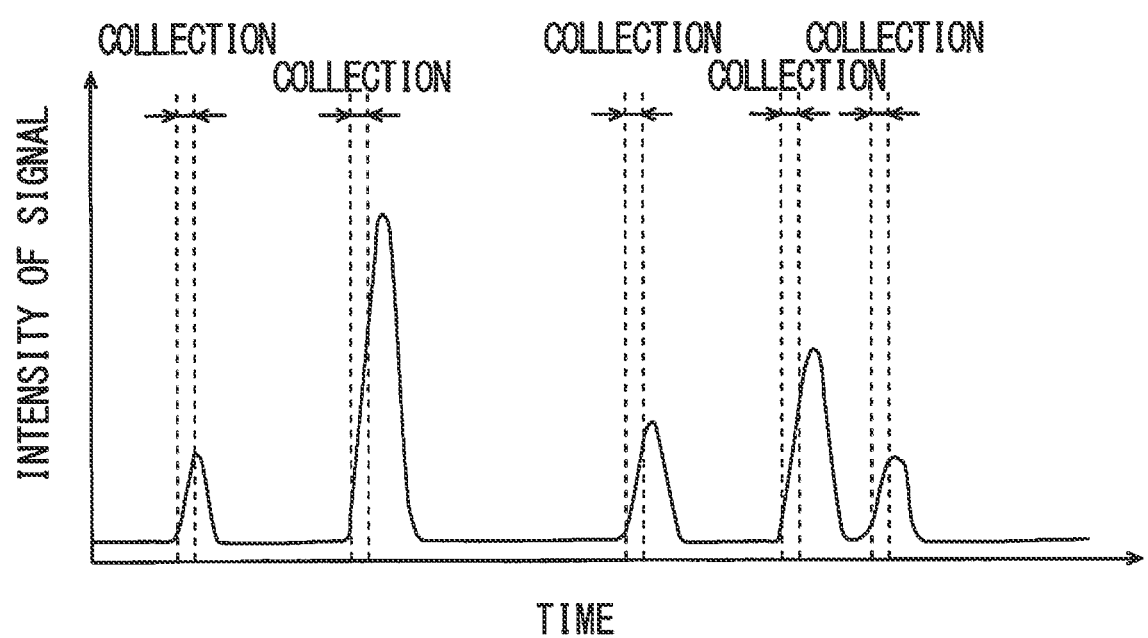
FIG. 2 A diagram for explaining a component collected by the same inventive example on a chromatogram.

One inventive example of a liquid chromatography separation system will be described below with reference to the drawings.

The liquid chromatography separation system of this inventive example mainly includes a separator 2, a collector 4, a switch valve 6 and a control device 8.

The separator 2 is to separate a sample into components by liquid chromatography and includes a sample injector 14, a separation column 16 and a detector 18 on an analysis flow path 10 through which a mobile phase flows. A liquid sending pump 12 is to send a mobile phase in the analysis flow path 10. The sample injector 14 is to inject a sample into the analysis flow path 10, and the sample injected into the analysis flow path 10 by the sample injector 14 is transferred to the separation column 16 by the mobile phase and separated into components. The components obtained by separation in the separation column 16 are detected by the detector 18. The downstream end of the analysis flow path 10 is connected to one port of the switch valve 6.

The collector 4 includes a plurality of sample loops 20 for fractionating an eluate including a desired component (target component) among the components obtained by separation in the separator 2 for collection and a switch mechanism made of two valves 22, 24 for selectively switching the sample loops 20 that guide the eluate from the separator 2. The valve 22 is connected to one port of the switch valve 6 via a flow path 26, and the valve 24 is connected to another port of the switch valve 6 via a flow path 28.

The switch valve 6 is a two-position valve including six ports. In addition to the downstream end of the analysis flow path 10, the flow path 26 that leads to the valve 22 and the flow path 28 that leads to the valve 24, a solvent supply flow path 30, a two-dimensional flow path 34 and a drain are connected to the ports of the switch valve 6. The switch valve 6 switches between a first state (the state shown in FIG. 1) in which the collector 4 is connected to a downstream portion in the analysis flow path 10 of the separator 2 and a second state (the state where the collector 4 is not connected to a downstream portion in the analysis flow path 10) in which the collector 4 is connected to a downstream portion in the solvent supply flow path 30.

The solvent supply flow path 30 is to supply a solvent to the sample loops 20 of the collector 4 by the liquid sending pump 32 and guide components collected in the sample loops 20 to the two-dimensional flow path 34. The two-dimensional flow path 34 is connected to a fraction collector 38, and a detector 36 is provided at a position farther upstream than the fraction collector 38.

The control device 8 is realized by a dedicated computer or a general personal computer that manages the operation of the entire liquid chromatography separation system, for example. The control device 8 includes a collection controller 40 and a loop connection time calculator 42. The collection controller 40 and the loop connection time calculator 42 are functions acquired by execution of a program by an arithmetic element such as a CPU provided in the control device 8.

The collection controller 40 is configured to control an operation of switching the valve 6 and the valves 22, 24 of the collector 4 based on a signal of the detector 18 and collect a predetermined amount of an eluate including a peak-beginning point of a target component on a chromatogram of an eluate including the target component in the sample loops 20. "A predetermined amount" of an eluate to be collected in the sample loops 20 is may be an amount that is set equal to or smaller than the volume of the sample loops 20 and may be substantially equal to the volume of the sample loops 20.

A period of time during which the sample loops 20 are to be connected to a downstream portion in the analysis flow path 10 of the separator 2 for collection of a predetermined amount of an eluate in the sample loops 20 (a loop connection time) can be obtained by division of an amount of an eluate to be collected in the sample loops 20 (the volume of the sample loops 20, for example) by a flow rate of a mobile phase flowing through the analysis flow path 10. The loop connection time calculator 42 is configured to calculate a loop connection time based on a flow rate of a mobile phase before the sample injector 14 injects a sample into the analysis flow path 10 after the flow rate of the mobile phase is set with respect to the liquid sending pump 12, or when a peak-beginning point of a target component is detected, for example. A peak-beginning point on a chromatogram of a sample component can be detected by whether a rate of change of intensity of a signal of the detector over time, that is, a slope of a peak waveform has exceeded a preset threshold value, for example.

The collection controller 40 is configured to connect a predetermined sample loop 20 to a downstream portion in the analysis flow path 10 at a point in time at which a portion that corresponds to a peak-beginning point of a target component detected based on a signal of the detector 18 arrives at the collector 4, and switch the switch valve 6 to the second state and disconnect the collector 4 from the separator 2 when a loop connection time calculated by the loop connection time calculator 42 elapses. The period of time from the time when the peak-beginning point of the sample component is detected by the detector 18 until the time when the peak-beginning point of the sample component arrives at the sample loop 20 can be obtained and set in advance by an experiment, calculation and so on.

In a case where there are a plurality of target components, the collection controller 40 controls the operation of switching the switch valve 6 and the valves 22, 24 of the collector 4 such that a predetermined amount of eluates including respective target components are collected in separate sample loops 20.

Thus, as shown in FIG. 2, even in a case where an amount of an eluate including a target component exceeds the volume of the sample loops 20, a certain amount of an eluate including a portion close to a beginning point of a sample component can be reliably collected in the sample loops 20.

The collection controller 40 can detect a peak-ending point of a target component from a rate of change of intensity of a signal of the detector over time, etc. Further, in a case where a peak-ending point is detected before a predetermined amount of eluate is introduced into the sample loops 20 after a peak-beginning point of a target component arrives at the sample loops 20, the collection controller 40 is configured to switch the switch valve 6 to the second state and end collection of an eluate in the sample loops 20.

As for the operation of the liquid chromatography separation system of this inventive example, a sample injected into the analysis flow path 10 by the sample injector 14 is separated into components in the separation column 16 and detected by the detector 18. The collection controller 40 switches the switch valve 6 and the valves 22 and 24 to connect the downstream end of the analysis flow path 10 to a predetermined sample loop 20 of the collector 4 when a target component is detected by the detector 18, and maintains the state until a loop connection time elapses from the time when a peak-beginning point of the target component arrives at the sample loop 20. Thus, a predetermined amount of an eluate including the target component is collected in the sample loop 20. In a case where there are a plurality of target components, a similar operation is repeatedly performed while the sample loops 20 to be connected to the downstream end of the analysis flow path 10 are switched.

After collection of the target component in the sample loop 20 is completed, the switch valve 6 and the valves 22, 24 are switched such that the sample loop 20 in which the target component is collected is connected to a downstream portion in the solvent supply flow path 30. Further, a solvent is supplied from the solvent supply flow path 30, and the target component collected in the sample loop 20 is guided to the two-dimensional flow path 34. That is, the positions to which the valves are connected are changed from the state shown in FIG. 1 such that the solvent supply flow path 30, the valve 22, the sample loops 20, the valve 24 and the two-dimensional flow path 34 are connected to one another in this order. A component introduced into the two-dimensional flow path 34 is detected by the detector 36, and the fraction collector 38 that operates based on a signal of the detector 36 fractionates each component in an individual container for collection.

Figure 3:
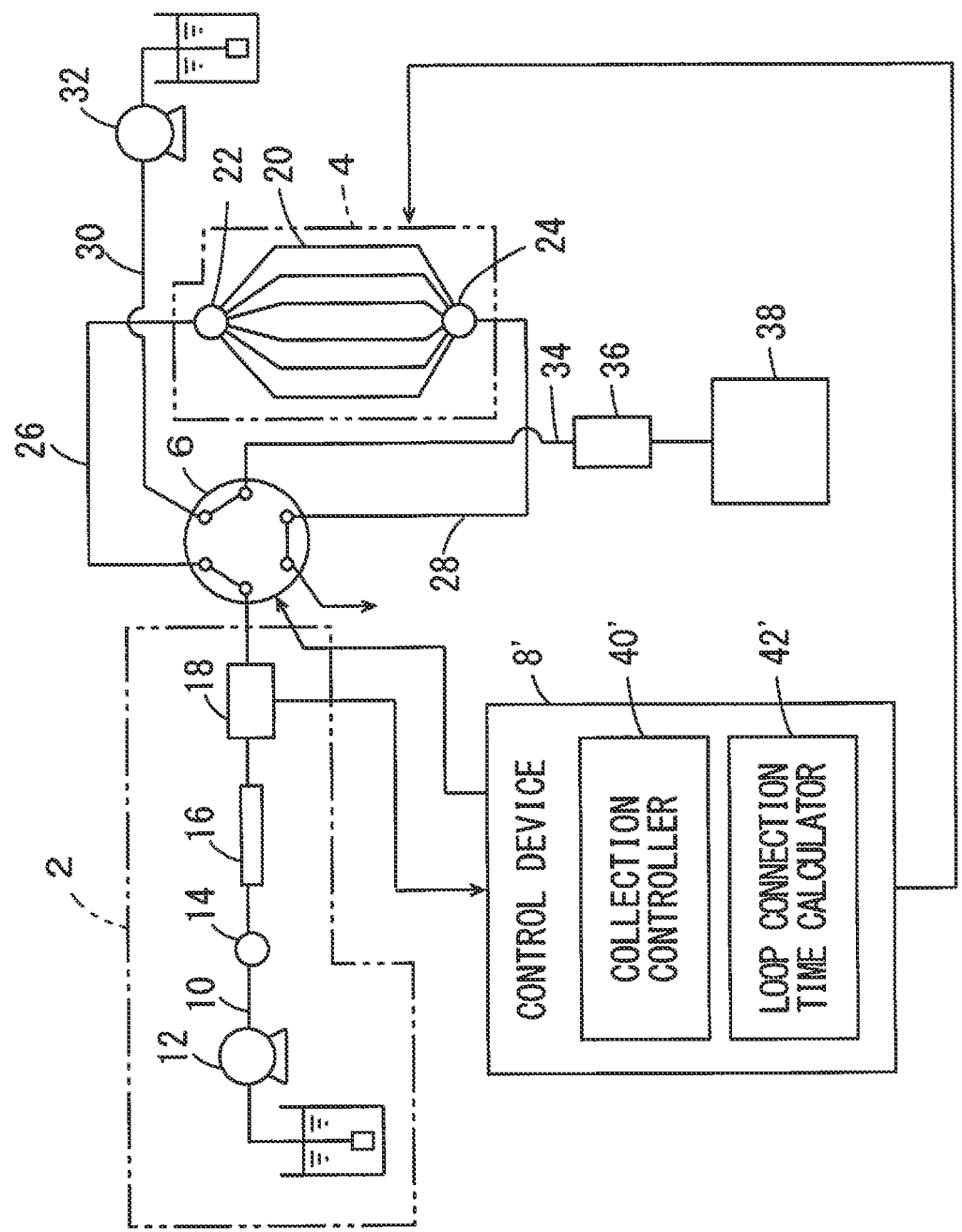
FIG. 3 A schematic diagram showing the configuration of another inventive example of a liquid chromatography separation system.

Next, another inventive example of a liquid chromatography separation system will be described next with reference to FIG. 3.

While the liquid chromatography separation system of this inventive example has the same basic configuration as that of the inventive example described with reference to FIG. 1, functions of a control device 8' are different from those of the control device 8 of the inventive example of FIG. 1. While the control device 8 of the inventive example of FIG. 1 includes a function of collecting a portion including a "peak-beginning point" of a target component of an eluate including a target component that has flowed out from the analysis flow path 10 in a predetermined sample loop 20, the control device 8' of this inventive example includes a function of collecting a portion including a "peak apex" of a target component of an eluate including the target component that has flowed out from the analysis flow path 10 in a predetermined sample loop 20.

A collection controller 40' of the control device 8' is configured to control an operation of switching the switch valve 6 and the valves 22, 24 of the collector 4 based on a signal of the detector 18 and collect a portion including a peak apex of a target component on a chromatogram of an eluate including the target component in a sample loop 20.

Figure 4:
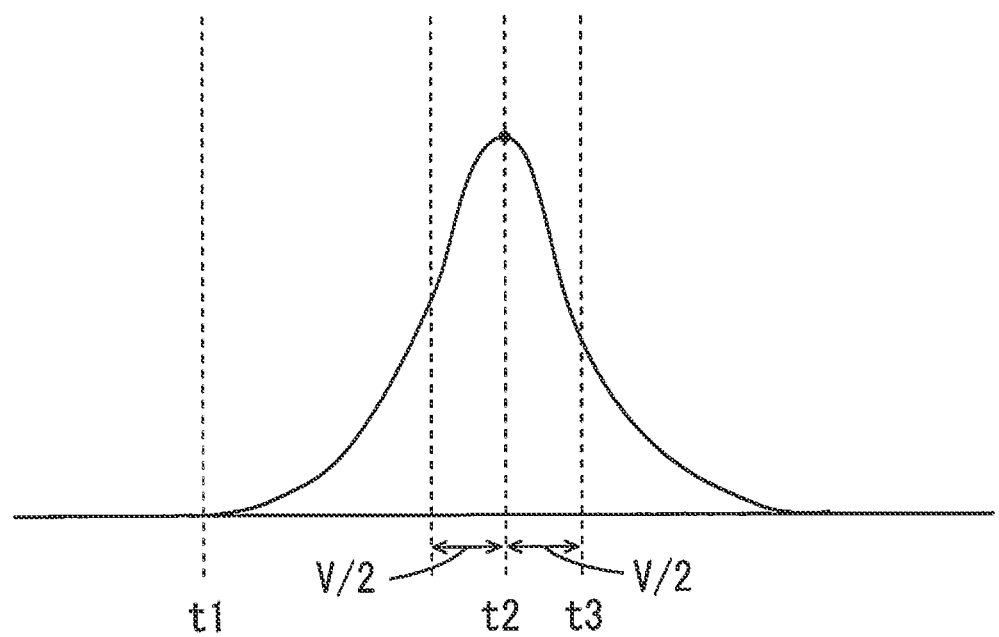
FIG. 4 A diagraph for explaining a component collected.

In this inventive example, as shown in FIG. 4, the collection controller 40' connects a predetermined sample loop 20 to a downstream portion in the analysis flow path 10 at a point t1 in time at which a portion corresponding to a peak-beginning point of a target component detected based on a signal of the detector 18 arrives at the collector 4. Then, the collection controller 40' switches the switch valve 6 to the second state to end collection of the target component at a point t3 in time. The point t3 in time is a point in time at which a predetermined amount, which is smaller than the volume of the sample loop 20, of an eluate is introduced into the sample loop 20 after a point t2 in time. The point t2 in time is a point in time at which a portion corresponding to the peak apex arrives at the sample loop 20 after the collection controller 40' detects a peak apex of the target component. In a case where the volume of a sample loop 20 is V, a predetermined amount may be V/2. Thus, V/2 of an eluate that is located farther forward than a peak apex and V/2 of an eluate that is located farther rearward than the peak apex can be collected in a sample loop 20.

A peak apex of a target component is a point at which a slope of peak changes from an increase to a decrease, that is, a point at which the sign of slope of peak is inverted. The collection controller 40' is configured to obtain a rate of change (slope) of intensity of a signal each time acquiring a signal from the detector 18 after detecting a peak-beginning point of a target component and detect a point at which the sign of slope is inverted as a peak apex.

A period of time (loop connection time) from the time when a peak apex of a target component arrives at a sample loop 20 until the time when a predetermined amount of an eluate is introduced into the sample loop 20 can be obtained by division of the predetermined amount by a flow rate of a mobile phase. In a case where a predetermined amount is V/2 (ml), and a flow rate of a mobile phase is P (ml/min), a loop connection time T can be obtained by T=V/2P.

A loop connection time calculator 42' is configured to calculate a loop connection time at a point in time at which a flow rate of a mobile phase is set or a point in time at which a peak-beginning point of a target component is detected. The collection controller 40' completes collection of a target component in a predetermined sample loop 20 when a loop connection time calculated by the loop connection time calculator 42' elapses from the time when a peak apex of the target component arrives at the sample loop 20.

In a case where a peak-ending point is detected before a loop connection time calculated by the loop connection time calculator 42' elapses from the time when a peak apex of a target component arrives at a predetermined sample loop 20, the collection controller 40' completes collection of the target component in the sample loop 20 at that point in time.

While the two-dimensional flow path 34 is connected to the fraction collector 38 in the inventive example described above, the present invention is not limited to this. A separation column may be provided on the two-dimensional flow path 34, and liquid chromatography of a target component that is fractionated and collected in the collector 4 may further be performed.

While the one switch valve 6 switches between the first state in which the collector 4 is connected to a position farther downstream than the separator 2 and the second state in which the collector 4 is not connected to a position farther downstream than the separator 2 in the above-mentioned inventive example, similar function may be implemented with use of two or more switch valves.

Furthermore, a mechanism for supplying a dilution solvent to each sample loop 20 of the collector 4 may be included.

While the collector 4 includes the plurality of sample loops 20 in the above-mentioned inventive example, the present invention is not limited to this. One or more sample loops 20 may be provided.

The inventive example described above is merely one example of embodiments of the liquid chromatography separation system according to the present invention. Embodiments of the liquid chromatography separation system according to the present invention are as follows.

In an embodiment of a liquid chromatography separation system according to the present invention, the liquid chromatography separation system includes a separator that is provided with a sample injector, a separation column and a detector on an analysis flow path through which a mobile phase flows and separates a sample injected into the analysis flow path by the sample injector into components, a collector that has one or more sample loops, connects the sample loop to a position farther downstream than the separator and collects an eluate, including a target component into which the sample is separated in the separator, in the sample loop, a switch valve for switching between a first state in which the sample loop is connected to the position farther downstream than the separator and a second state in which the sample loop is not connected to the position farther downstream than the separator, and a collection controller that is configured to detect a peak-beginning point and/or a peak apex of the target component based on a signal of the detector, control an operation of switching the switch valve based on the detected peak-beginning point and/or the detected peak apex and collect a portion including the peak-beginning point or the peak apex of the eluate including the target component in the sample loop.

In a first aspect of the above-mentioned embodiment of the liquid chromatography separation system according to the present invention, the collector has the plurality of sample loops and a switch mechanism for selectively switching a sample loop to be connected to the separator from among the plurality of sample loops, and the collection controller is configured to also control an operation of the switch mechanism of the collector and collect a plurality of target components that are obtained by separation in the separator in the respective sample loops.

In a second aspect of the above-mentioned embodiment of the liquid chromatography separation system according to the present invention, the collector includes a loop connection time calculator configured to calculate a loop connection time which is a period of time during which the switch valve is put in the first state for collection of a predetermined amount, equal to or smaller than a volume of the sample loop, of an eluate in the sample loop based on a flow rate of a mobile phase flowing through the analysis flow path, and the collection controller is configured to put the switch valve in the first state for the loop connection time calculated by the loop connection time calculator from a time when a peak-beginning point of a sample component to be collected in the sample loop arrives at the sample loop.

In the above-mentioned second aspect, the loop connection time calculator can be configured to calculate the loop connection time by division of the predetermined amount by the flow rate of the mobile phase.

In the above-mentioned second aspect, the loop connection time calculator may be configured to calculate the loop connection time when the peak-beginning point of the target component is detected based on a detection signal of the detector.

In the above-mentioned second aspect, the loop connection time calculator may be configured to calculate the loop connection time after the flow rate of the mobile phase is set and before the sample is injected into the analysis flow path in the separator.

In a third aspect of the above-mentioned embodiment of the liquid chromatography separation system according to the present invention, the collection controller is configured to switch the switch valve to the second state in a case where a peak-ending point of the target component is detected in the middle of collection of the eluate including the target component in the sample loop. With such an aspect, an excess eluate not including the target component can be prevented from being collected in the sample loop, and a reduction in concentration of the collected target component can be suppressed.

In a fourth aspect of the above-mentioned embodiment of the liquid chromatography separation system according to the present invention, the collection controller is configured to switch the switch valve from the first state to the second state and thus collect a predetermined amount of the eluate before and after the peak apex of the target component in a case where a predetermined amount smaller than a volume of the sample loop of the eluate is introduced into the sample loop after the peak apex of the target component arrives at the sample loop. With such an aspect, a portion including a target component having a high concentration of the eluate that has flowed out from the separator can be collected.

In the above-mentioned fourth aspect, the collection controller can be configured to detect a position at which a sign of slope of peak of the target component is inverted as the apex.

In the above-mentioned fourth aspect, the predetermined amount may be half of the volume of the sample loop. Then, the eluate before and after the peak apex of the target component can be collected uniformly in the sample loop.

In the above-mentioned fourth aspect, a loop connection time calculator that calculates a loop connection time, which is a period of time from a time when the peak apex of the target component arrives at the sample loop until a time when the predetermined amount of the eluate is introduced into the sample loop, with use of the predetermined amount and the flow rate of the mobile phase may be included, and the collection controller may be configured to switch the switch valve from the first state to the second state when the loop connection time calculated by the loop connection time calculator elapses from a time when the peak apex of the target component arrives at the sample loop.

In the above-mentioned fourth aspect, the collection controller may be configured to switch the switch valve from the second state to the first state at a point in time at which the peak-beginning point of the target component arrives at the sample loop.

REFERENCE SIGNS LIST

2 Separator
4 Collector
6 Switch valve
8 Control device
10 Analysis flow path
12, 32 Liquid sending pumps
14 Sample injector
16 Separation column
18, 26 Detectors
20 Sample loop
22, 24 Valves (Switch mechanisms)
26, 28 Flow paths
30 Solvent supply flow path
34 Two-dimensional flow path
38 Fraction collector
40 Collection controller
42 Loop connection time calculator

The invention claimed is:

1. A liquid chromatography separation system comprising:
 a separator that is provided with a sample injector, a separation column and a detector on an analysis flow path through which a mobile phase flows and separates a sample injected into the analysis flow path by the sample injector into components;
 a collector that has one or more sample loops, connects the sample loop to a position farther downstream than the separator and collects an eluate, including a target component into which the sample is separated in the separator, in the sample loop;
 a switch valve for switching between a first state in which the sample loop is connected to the position farther downstream than the separator and a second state in which the sample loop is not connected to the position farther downstream than the separator;
 a collection controller that is configured to detect a peak-beginning point and/or a peak apex of the target component based on a signal of the detector, control an operation of switching the switch valve based on the detected peak-beginning point and/or the detected peak apex and, in a case where an amount of the eluate including the target component is larger than a volume of the one sample loop, collect only a predetermined amount of the eluate that includes a peak-beginning point of the target component and is equal to or smaller than the volume of the one sample loop into the one sample loop and not collect a remaining amount exceeding the predetermined amount.

2. The liquid chromatography separation system according to claim 1, wherein
the collector has the plurality of sample loops and a switch mechanism for selectively switching a sample loop to be connected to the separator from among the plurality of sample loops, and
the collection controller is configured to also control an operation of the switch mechanism of the collector and collect a plurality of target components that are generated by separation in the separator in the separate sample loops.

3. The liquid chromatography separation system according to claim 1, wherein
the loop connection time calculator is further configured to calculate a loop connection time which is a period of time during which the switch valve is put in the first state for collection of a predetermined amount, equal to or smaller than a volume of the sample loop, of an eluate in the sample loop based on a flow rate of a mobile phase flowing through the analysis flow path, and
the collection controller is further configured to put the switch valve in the first state for the loop connection time calculated by the loop connection time calculator from a time when the peak-beginning point of the target component arrives at the sample loop.

4. The liquid chromatography separation system according to claim 3, wherein
the loop connection time calculator is configured to calculate the loop connection time by division of the predetermined amount by the flow rate of the mobile phase.

5. The liquid chromatography separation system according to claim 3, wherein
the loop connection time calculator is configured to calculate the loop connection time when the peak-beginning point of the target component is detected based on a detection signal of the detector.

6. The liquid chromatography separation system according to claim 3, wherein
the loop connection time calculator is configured to calculate the loop connection time after the flow rate of the mobile phase is set and before the sample is injected into the analysis flow path in the separator.

7. The liquid chromatography separation system according to claim 1, wherein
the collection controller is configured to switch the switch valve to the second state and end collection of the eluate in the sample loop in a case where a peak-ending point of the target component is detected in the middle of collection of the eluate including the target component in the sample loop.

8. The liquid chromatography separation system according to claim 1, wherein
the collection controller is configured to switch the switch valve from the first state to the second state and thus collect a portion before and after the peak apex of the target component of the eluate in a case where a predetermined amount smaller than a volume of the sample loop of the eluate is introduced into the sample loop after the peak apex of the target component arrives at the sample loop.

9. The liquid chromatography separation system according to claim 8, wherein
the collection controller is configured to detect a position at which a sign of slope of peak of the target component is inverted as the apex.

10. The liquid chromatography separation system according to claim 8, wherein
the predetermined amount is half of the volume of the sample loop.

11. The liquid chromatography separation system according to claim 8, comprising the loop connection time calculator that calculates the loop connection time, which is a period of time from a time when the peak apex of the target component arrives at the sample loop until a time when half of a volume of the sample loop of the eluate is introduced into the sample loop, with use of the volume of the sample loop and the flow rate of the mobile phase, wherein
the collection controller is configured to switch the switch valve from the first state to the second state when the loop connection time calculated by the loop connection time calculator elapses from a time when the peak apex of the target component arrives at the sample loop.

12. The liquid chromatography separation system according to claim 8, wherein
the collection controller is configured to switch the switch valve from the second state to the first state at a point in time at which the peak-beginning point of the target component arrives at the sample loop.

13. A liquid chromatography separation system comprising:
a separator that is provided with a sample injector, a separation column and a detector on an analysis flow path through which a mobile phase flows and separates a sample injected into the analysis flow path by the sample injector into components;
a collector that has one or more sample loops, connects the sample loop to a position farther downstream than the separator and collects an eluate, including a target component into which the sample is separated in the separator, in the sample loop;
a switch valve for switching between a first state in which the sample loop is connected to the position farther downstream than the separator and a second state in which the sample loop is not connected to the position farther downstream than the separator; and
a collection controller that is configured to detect a peak-beginning point and/or a peak apex of the target component based on a signal of the detector, control an operation of switching the switch valve based on the detected peak-beginning point and/or the detected peak apex and collect an amount of an eluate that includes a peak-beginning point of the target component and is equal to or smaller than a volume of the sample loop or an amount of eluate that includes a portion before and after the peak apex of the target component and is equal to or smaller than a volume of the sample loop in a case where an amount of the eluate including the target component is larger than the volume of the sample loop, and
a loop connection time calculator configured to calculate a loop connection time which is a period of time during which the switch valve is put in the first state for collection of a predetermined amount, equal to or smaller than a volume of the sample loop, of an eluate in the sample loop based on a flow rate of a mobile phase flowing through the analysis flow path, wherein:

the collection controller is configured to put the switch valve in the first state for the loop connection time calculated by the loop connection time calculator from a time when the peak-beginning point of the target component arrives at the sample loop; and the loop connection time calculator is configured to calculate the loop connection time by division of the predetermined amount by the flow rate of the mobile phase.

14. A liquid chromatography separation system comprising:

a separator that is provided with a sample injector, a separation column and a detector on an analysis flow path through which a mobile phase flows and separates a sample injected into the analysis flow path by the sample injector into components;

a collector that has one or more sample loops, connects the sample loop to a position farther downstream than the separator and collects an eluate, including a target component into which the sample is separated in the separator, in the sample loop;

a switch valve for switching between a first state in which the sample loop is connected to the position farther downstream than the separator and a second state in which the sample loop is not connected to the position farther downstream than the separator; and a collection controller that is configured to detect a peak-beginning point and/or a peak apex of the target component based on a signal of the detector, control an operation of switching the switch valve based on the detected peak-beginning point and/or the detected peak apex and collect an amount of an eluate that includes a peak-beginning point of the target component and is equal to or smaller than a volume of the sample loop or an amount of eluate that includes a portion before and after the peak apex of the target component and is equal to or smaller than a volume of the sample loop in a case where an amount of the eluate including the target component is larger than the volume of the sample loop;

wherein the collection controller is configured to switch the switch valve to the second state and end collection of the eluate in the sample loop in a case where a peak-ending point of the target component is detected in the middle of collection of the eluate including the target component in the sample loop.

15. A liquid chromatography separation system comprising:

a separator that is provided with a sample injector, a separation column and a detector on an analysis flow path through which a mobile phase flows and separates a sample injected into the analysis flow path by the sample injector into components;

a collector that has one or more sample loops, connects the sample loop to a position farther downstream than the separator and collects an eluate, including a target component into which the sample is separated in the separator, in the sample loop;

a switch valve for switching between a first state in which the sample loop is connected to the position farther downstream than the separator and a second state in which the sample loop is not connected to the position farther downstream than the separator; and a collection controller that is configured to detect a peak-beginning point and/or a peak apex of the target component based on a signal of the detector, control an operation of switching the switch valve based on the detected peak-beginning point and/or the detected peak apex and collect an amount of an eluate that includes a peak-beginning point of the target component and is equal to or smaller than a volume of the sample loop or an amount of eluate that includes a portion before and after the peak apex of the target component and is equal to or smaller than a volume of the sample loop in a case where an amount of the eluate including the target component is larger than the volume of the sample loop, wherein:

the collection controller is configured to switch the switch valve from the first state to the second state and thus collect a portion before and after the peak apex of the target component of the eluate in a case where a predetermined amount smaller than a volume of the sample loop of the eluate is introduced into the sample loop after the peak apex of the target component arrives at the sample loop; and the predetermined amount is half of the volume of the sample loop.

* * * * *